(12) United States Patent
Ozeki et al.

(10) Patent No.: US 11,098,808 B2
(45) Date of Patent: Aug. 24, 2021

(54) CONTROL VALVE (71) Applicant: YAMADA MANUFACTURING CO., LTD., Kiryu (JP)

(72) Inventors: Akifumi Ozeki, Kiryu (JP); Toshihito Nagai, Kiryu (JP)

(73) Assignee: YAMADA MANUFACTURING CO., LTD., Kiryu (JP)

(*) Notice: Subject to any disclaimer, the term of this patent is extended or adjusted under 35 U.S.C. 154(b) by 16 days.

(21) Appl. No.: 16/723,290

(22) Filed: Dec. 20, 2019

(65) Prior Publication Data

US 2020/0309276 A1 Oct. 1, 2020

(30) Foreign Application Priority Data

Mar. 27, 2019 (JP) .............................. JP2019-060917

(51) Int. Cl.
*F16K 11/085* (2006.01)
*F16K 27/06* (2006.01)

(52) U.S. Cl.
CPC .......... *F16K 11/085* (2013.01); *F16K 27/065* (2013.01)

(58) Field of Classification Search
CPC ................. F16K 11/085; F16K 27/065; Y10T 137/86871
See application file for complete search history.

(56) References Cited

U.S. PATENT DOCUMENTS

| 4,778,148 | A * | 10/1988 | Kruger | F01L 7/16 123/190.17 |
| 7,603,940 | B2 * | 10/2009 | Stellwagen | F15B 11/0445 91/446 |
| 9,897,217 | B2 * | 2/2018 | Greene | F16K 11/085 |
| 10,359,121 | B2 * | 7/2019 | Ozeki | F01P 5/12 |
| 10,458,562 | B2 * | 10/2019 | Ozeki | F16K 11/0856 |
| 10,508,748 | B2 * | 12/2019 | Ozeki | F01P 7/16 |
| 10,626,999 | B2 * | 4/2020 | Ozeki | F16K 11/0856 |
| 10,648,577 | B2 * | 5/2020 | Ozeki | F16K 11/0712 |
| 2019/0291535 | A1 * | 9/2019 | Ozeki | F01P 7/165 |
| 2019/0292976 | A1 * | 9/2019 | Ozeki | F01P 7/14 |
| 2019/0390781 | A1 * | 12/2019 | Ozeki | F16K 5/181 |
| 2020/0049263 | A1 * | 2/2020 | Ozeki | F16K 11/076 |
| 2020/0049264 | A1 * | 2/2020 | Ozeki | F16K 11/085 |

(Continued)

FOREIGN PATENT DOCUMENTS

JP 2017-003064 1/2017

*Primary Examiner* — Kevin R Barss (74) *Attorney, Agent, or Firm* — Rankin, Hill & Clark LLP (57) ABSTRACT

A control valve includes a casing, a valve body, and a seal cylinder member. The casing has an inlet and an outlet. The valve body is rotatably disposed inside the casing, and has a peripheral wall portion formed with a valve hole providing communicating between the inside and the outside. One end portion of the seal cylinder member communicates with a downstream side of the outlet, and a valve sliding contact surface is provided at the other end portion. A protruding height of the other end portion of the seal cylinder member continuously changes in a circumferential direction thereof to conform to a shape of an outer circumferential surface of the circumferential wall portion. A region of the other end portion of the seal cylinder member where the protruding height is lower is provided with a thick portion that is thicker than other portions and reaches the valve-sliding contact surface.

3 Claims, 8 Drawing Sheets

(56) References Cited

U.S. PATENT DOCUMENTS

2020/0088308 A1\* 3/2020 Ozeki .................... F01P 7/165
2020/0309275 A1\* 10/2020 Ozeki .................. F16K 11/085
2020/0309276 A1\* 10/2020 Ozeki ...................... F01P 7/14

\* cited by examiner

CONTROL VALVE

CROSS-REFERENCE TO RELATED APPLICATION

Priority is claimed on Japanese Patent Application No. 2019-060917, filed Mar. 27, 2019, the content of which is incorporated herein by reference.

BACKGROUND OF THE INVENTION

Field of the Invention

The present invention relates to a control valve used for switching a flow path of cooling water for a vehicle.

Description of Related Art

In a cooling system that cools an engine using cooling water, separately from a radiator flow path that circulates cooling water between a radiator and the engine, a bypass flow path that bypasses a radiator, a warm-up flow path that passes through an oil warmer, or the like, may also be provided. In a cooling system of this type, control valves are interposed at branch portions of flow paths, which are appropriately switched by the control valves. As a control valve, a valve in which a cylindrical valve body is rotatably disposed in a casing and an arbitrary flow path is opened and closed according to rotational positions of the valve body is known (for example, see Japanese Unexamined Patent Application, First Publication No. 2017-3064 (hereinafter, Patent Document 1)).

In the control valve disclosed in Patent Document 1, an inlet through which a liquid such as cooling water flows in, and a plurality of outlet through which the liquid that has flowed in flows to the outside are provided in a casing. A plurality of valve holes providing communication between the inside and the outside are formed in a circumferential wall of the valve body corresponding to the plurality of outlets. One end portion side of a substantially cylindrical seal cylinder member is slidably held at each outlet. The one end portion of each seal cylinder member communicates with a downstream side of the corresponding outlet. Further, a valve sliding contact surface that slidably comes into contact with an outer circumferential surface of the valve body is provided at the other end portion of each seal cylinder member. The valve sliding contact surface of each seal cylinder member comes into sliding contact with the outer circumferential surface of the valve body at a position overlapping a rotational path of the corresponding valve hole of the valve body.

In addition, the valve sliding contact surface of the seal cylinder member is formed to conform to a shape of an outer surface of the valve body through close contact with the outer circumferential surface of the valve body. That is, in the other end portion of the seal cylinder member in an axial direction thereof, a protruding height thereof in the valve body direction continuously changes in a circumferential direction of the seal cylinder member to conform to the shape of the outer surface of the valve body.

When the seal cylinder member is at a position where it communicates with the corresponding valve hole, the valve body of the control valve allows an outflow of the liquid from an internal region of the valve body through the corresponding outlet. When the seal cylinder member is at a position where it does not communicate with the corresponding valve hole, the valve body of the control valve blocks an outflow of the liquid from the internal region of the valve body through the corresponding outlet. Also, the rotational position of the valve body is operated using an actuator such as an electric motor.

SUMMARY OF THE INVENTION

In the conventional control valve, the protruding height of the other end portion of the seal cylinder member continuously changes to conform to the shape of the outer surface of the cylindrical valve body. For this reason, the seal cylinder member having elasticity and the valve body come in contact with each other at a curved surface portion, whereby a Hertz surface pressure on the contact surface increases when a load acts between them in directions in which they are pressed toward each other. In the seal cylinder member, a Hertz surface pressure in a region where the protruding height on the other end portion side is the lowest (a region where the shape changes into a concave shape) increases. Therefore, in the conventional control valve, when the valve body is operated to rotate in a state where the seal cylinder member is pressed against the outer circumferential surface of the valve body, there is a concern that the valve sliding contact surface in the region where the protruding height on the other end portion side of the seal cylinder member is lower may wear out early.

Aspects according to the present invention have been derived in consideration of such circumstances, and it is an object of the present invention to provide a control valve in which it is possible to inhibit an increase in a local surface pressure on a valve sliding contact surface of a seal cylinder member resulting from a change in a protruding height of an end portion in an axial direction of the seal cylinder member, thereby inhibiting early wear of the seal cylinder member.

In order to solve the above problems, the present invention employs the following aspects.

(1) A control valve according to an aspect of the present invention includes a casing having an inlet through which a liquid flows in from an outside and an outlet through which the liquid that has flowed in an inside flows to the outside, a valve body which is rotatably disposed inside the casing and has a circumferential wall portion formed with a valve hole providing communication between the inside and the outside, and a seal cylinder member of which one axial end portion communicates with a downstream side of the outlet and the other axial end portion is provided with a valve sliding contact surface which slidably comes in contact with an outer circumferential surface of the circumferential wall portion at a position at least partly overlapping a rotational path of the valve hole of the valve body, in which a protruding height of the other axial end portion of the seal cylinder member in a direction toward the circumferential wall portion continuously changes in a circumferential direction thereof to conform to a shape of the outer circumferential surface of the circumferential wall portion, and a region of the other axial end portion of the seal cylinder member where the protruding height is lower is provided with a thick portion which is thicker than the other portions and reaches the valve sliding contact surface.

According to the above aspect (1), when the other axial end portion of the seal cylinder member is closed by the outer circumferential surface of the circumferential wall portion of the valve body, the outflow of the liquid from the inside of the valve body through the outlet is blocked. When the valve body rotates from the above state and the other axial end portion of the seal cylinder member communicates with (overlaps) the valve hole of the valve body, the liquid flows out from the inside of the valve body through the outlet. When the other axial end portion of the seal cylinder member is closed by the outer circumferential surface of the circumferential wall portion of the valve body, the valve sliding contact surface of the seal cylinder member is pressed against the circumferential wall portion of the valve body. In this case, on the other end portion side of the seal cylinder member, a Hertz surface pressure in the region where the protruding height in the valve body direction is lower increases. However, in the above aspect (1), since the thick portion reaching the valve sliding contact surface is provided in the region where the protruding height on the other end portion side of the seal cylinder member is lower, an increase of a local surface pressure in the region where the protruding height is lower is inhibited. As a result, early wear of the region where the protruding height is lower is inhibited.

(2) In the above aspect (1), the thick portion may be provided to protrude inward from a circumferential wall of the seal cylinder member in a radial direction thereof.

In this case, since the shape of the outer surface of the seal cylinder member on the other end portion side can be formed in a circular shape, a structure of a holding portion on the casing side that holds the seal cylinder member can be simplified in the case of adopting a structure in which the other end portion side of the seal cylinder member is slidably held at the outlet of the casing or the like. In addition, in this case, a seal structure between the seal cylinder member and the holding portion on the casing side can be simplified. Therefore, manufacture of the control valve can be facilitated, and thus manufacturing costs can be reduced.

(3) In the above aspect (2), linear inner edge portions extending in a direction substantially orthogonal to a rotational axis of the valve body may be formed by the thick portion at two positions facing each other in an inner circumferential portion of the valve sliding contact surface.

In this case, since a shape of an inner surface of the seal cylinder member is also a relatively simple shape, it can be manufactured at a low cost. In addition, when the seal cylinder member is viewed from the side of the other end portion, a position of the seal cylinder member in the circumferential direction can be easily seen due to the linear inner edge portions in the inner periphery of the seal cylinder member. Therefore, the seal cylinder member can be easily assembled to the casing side when the control valve is manufactured.

(4) In the above aspect (2) or (3), the seal cylinder member may have a first cylindrical portion which is positioned on the one end portion side and communicates with the downstream side of the outlet and a second cylindrical portion which is positioned on the other end portion side and whose axial end surface constitutes the valve sliding contact surface, an inner diameter of the first cylindrical portion being formed to be smaller than an inner diameter of the second cylindrical portion, and the thick portion may be provided in the second cylindrical portion.

In this case, a flow rate of the liquid flowing out to the downstream side of the outlet through the seal cylinder member is determined according to the inner diameter of the first cylindrical portion of the seal cylinder member having the relatively smaller inner diameter. Since the thick portion is provided on a radially inner side of the second cylindrical portion having the relatively larger inner diameter, it does not affect the flow rate of the liquid flowing out to the downstream side of the outlet. Therefore, it is possible to easily set and adjust the flow rate of the liquid flowing out through the outlet.

According to the aspects of the present invention, since the thick portion which is thicker than the other portions and reaches the valve sliding contact surface is provided in the region where the protruding height is lower in the circumferential wall of the other axial end portion of the seal cylinder member, it is possible to inhibit an increase in local surface pressure in the region where the protrusion height is lower, thereby inhibiting early wear of the seal cylinder member.

DETAILED DESCRIPTION OF THE INVENTION

Next, an embodiment of the present invention will be described with reference to the drawings. In the following description, an example in which a control valve of the present embodiment is employed in a cooling system that cools an engine using cooling water will be described.
[Cooling System]
FIG. 1 is a block diagram of a cooling system 1.

Figure 1:
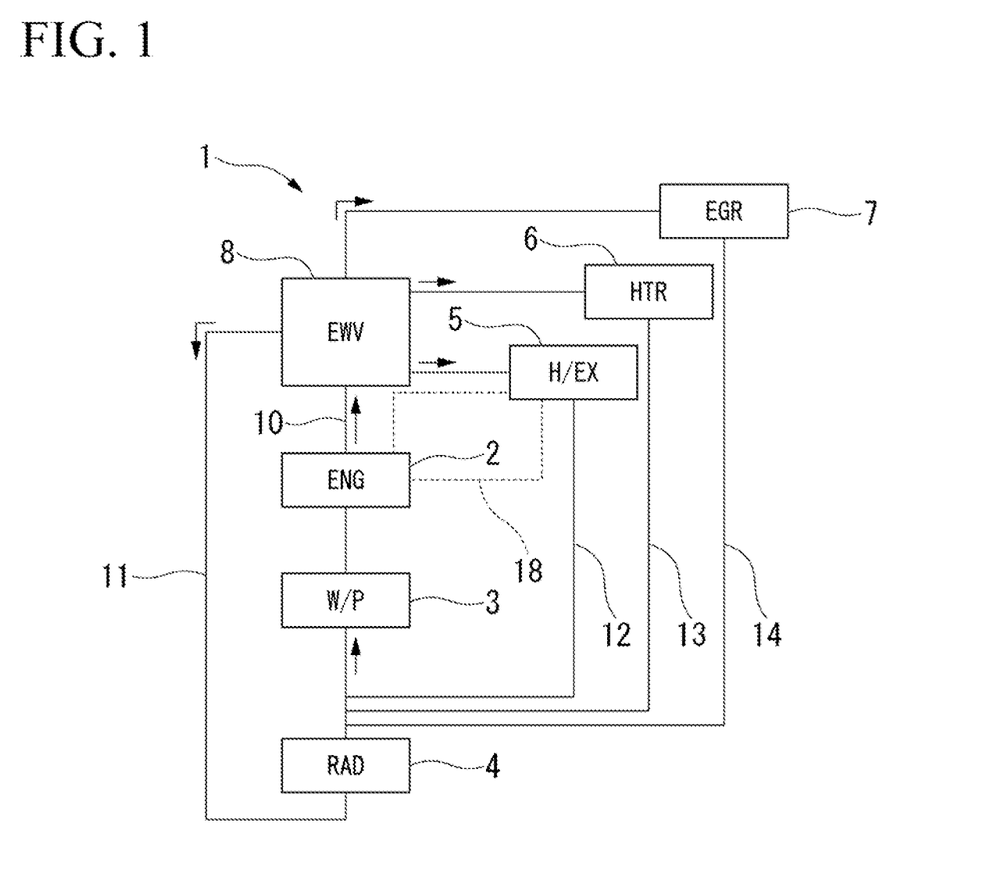
FIG. 1 is a block diagram of a cooling system according to an embodiment.

As shown in FIG. 1, the cooling system 1 is mounted in a vehicle having at least an engine in a vehicle drive source. Also, the vehicle may be a vehicle having only an engine, a hybrid vehicle, a plug-in hybrid vehicle, or the like.

The cooling system 1 is configured by connecting an engine 2 (ENG), a water pump 3 (W/P), a radiator 4 (RAD), a heat exchanger 5 (H/EX), a heater core 6 (HTR), an exhaust gas recirculation (EGR) cooler 7 (EGR), and a control valve 8 (EWV) with various flow paths 10 to 14.

The water pump 3, the engine 2, and the control valve 8 are connected to each other in order from an upstream side to a downstream side of a main flow path 10. In the main flow path 10, the water pump 3 is operated to cause cooling water (liquid) to pass through the engine 2 and the control valve 8 in order.

A radiator flow path 11, a warm-up flow path 12, an air conditioning flow path 13 and an EGR flow path 14 are each connected to the main flow path 10. The radiator flow path 11, the warm-up flow path 12, the air conditioning flow path 13, and the EGR flow path 14 connect portions on an upstream side of the water pump 3 in the main flow path 10 and the control valve 8.

The radiator 4 is connected to the radiator flow path 11. With the radiator flow path 11, heat exchange between the cooling water and the outside air in the radiator 4 is performed.

The heat exchanger 5 is connected to the warm-up flow path 12. Engine oil circulates between the heat exchanger 5 and the engine 2 through an oil flow path 18. With the warm-up flow path 12, heat exchange between the cooling water and the engine oil in the heat exchanger 5 is performed. That is, the heat exchanger 5 functions as an oil warmer when a water temperature is higher than an oil temperature and heats the engine oil. On the other hand, the heat exchanger 5 functions as an oil cooler when the water temperature is lower than the oil temperature and cools the engine oil.

The heater core 6 is connected to the air conditioning flow path 13. The heater core 6 is provided, for example, in a duct (not shown) of an air conditioner. With the air conditioning flow path 13, heat exchange between the cooling water and conditioning air, which flows in the duct, in the heater core 6 is performed.

The EGR cooler 7 is connected to the EGR flow path 14. With the EGR flow path 14, heat exchange between the cooling water and EGR gas in the EGR cooler 7 is performed.

In the cooling system 1 described above, the cooling water that has passed through the engine 2 in the main flow path 10 flows into the control valve 8 and is then selectively distributed to the various flow paths 11 to 13 in accordance with operations of the control valve 8. Thus, controls for an early temperature rise, a high water temperature (an optimum temperature), etc., can be realized, thereby achieving an improvement in fuel economy of a vehicle.

<Control Valve>

Figure 2:
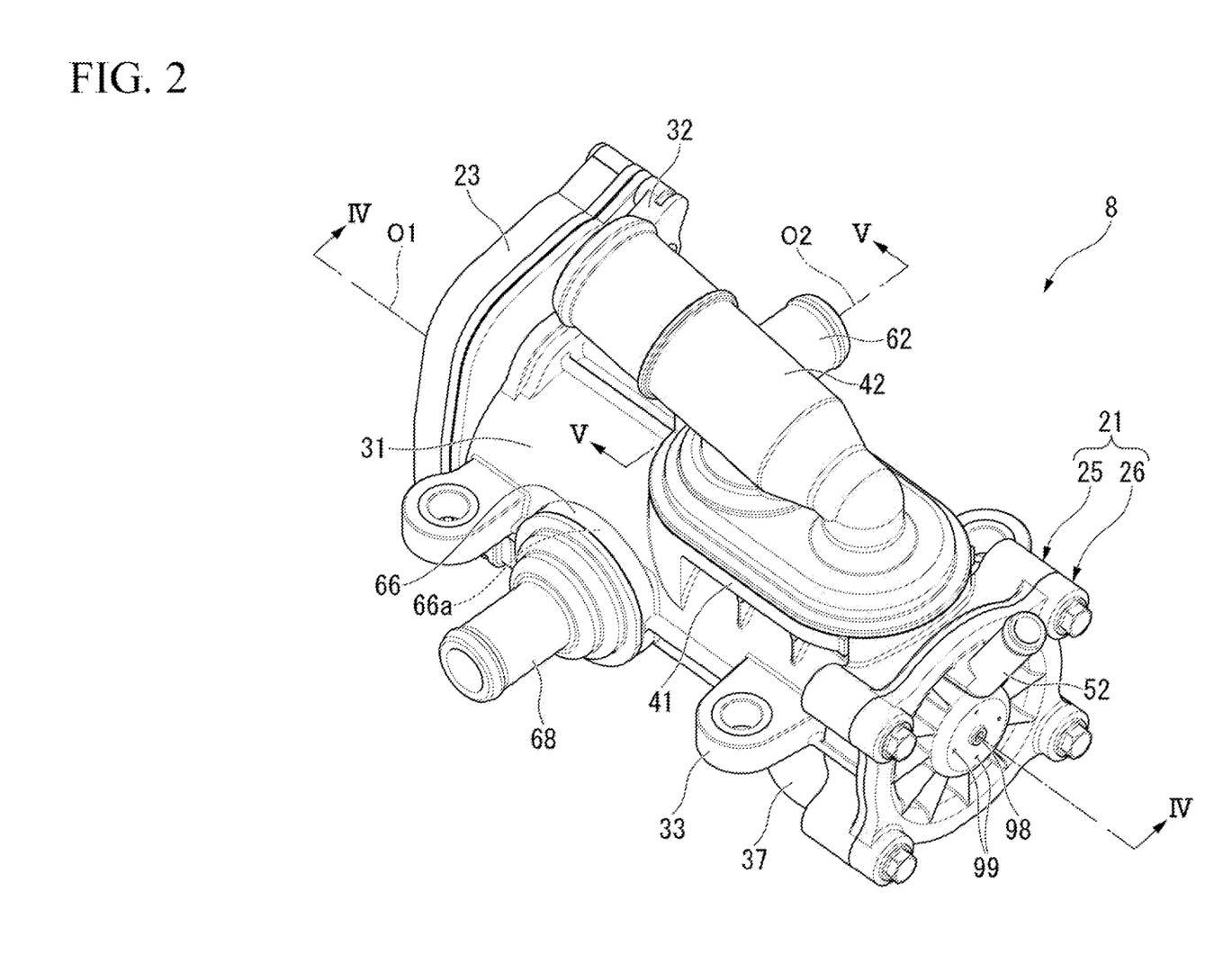
FIG. 2 is a perspective view of a control valve according to the embodiment.
Figure 3:
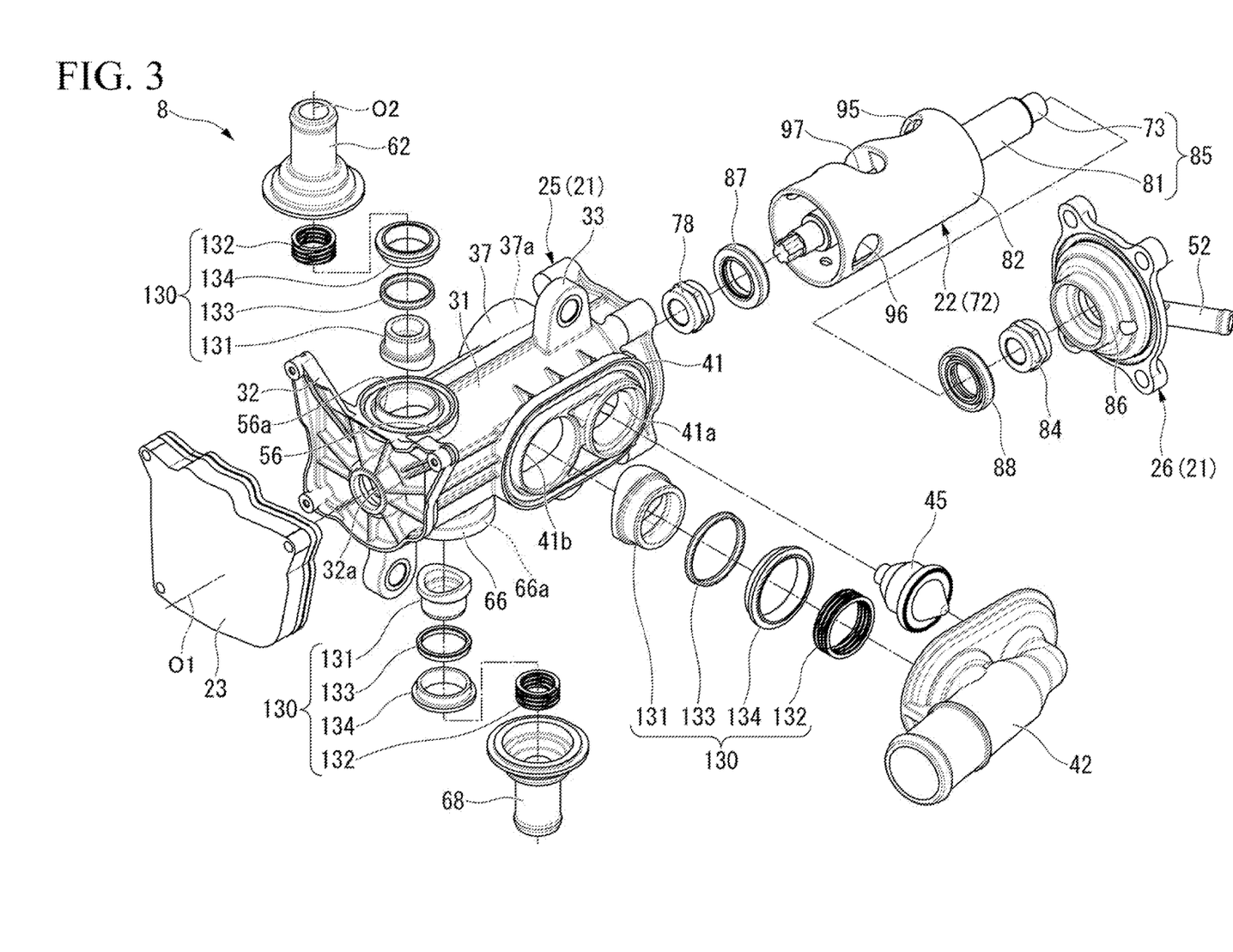
FIG. 3 is an exploded perspective view of the control valve according to the embodiment.

FIG. 2 is a perspective view of the control valve 8. FIG. 3 is an exploded perspective view of the control valve 8.

As shown in FIGS. 2 and 3, the control valve 8 mainly includes a casing 21, a valve body 22 (see FIG. 3), and a drive unit 23.

(Casing)

The casing 21 has a bottomed cylindrical casing body 25 and a lid body 26 that closes an opening portion of the casing body 25. Also, in the following description, a direction along an axis O1 of the casing 21 is simply referred to as a case axis direction. In the case axis direction, a side toward a bottom wall portion 32 of the casing body 25 with respect to a case circumferential wall 31 of the casing body 25 is referred to as a first side, and a side toward the lid body 26 with respect to the case circumferential wall 31 of the casing body 25 is referred to as a second side. Further, a direction orthogonal to the axis O1 is referred to as a case radial direction, and a direction around the axis O1 is referred to as a case circumferential direction.

A plurality of attachment pieces 33 are formed on the case circumferential wall 31 of the casing body 25. Each attachment piece 33 protrudes outward in the case radial direction from the case circumferential wall 31. The control valve 8 is fixed in an engine room via the attachment pieces 33, for example. Also, positions, numbers, and the like of the respective attachment pieces 33 can be changed as appropriate.

Figure 4:
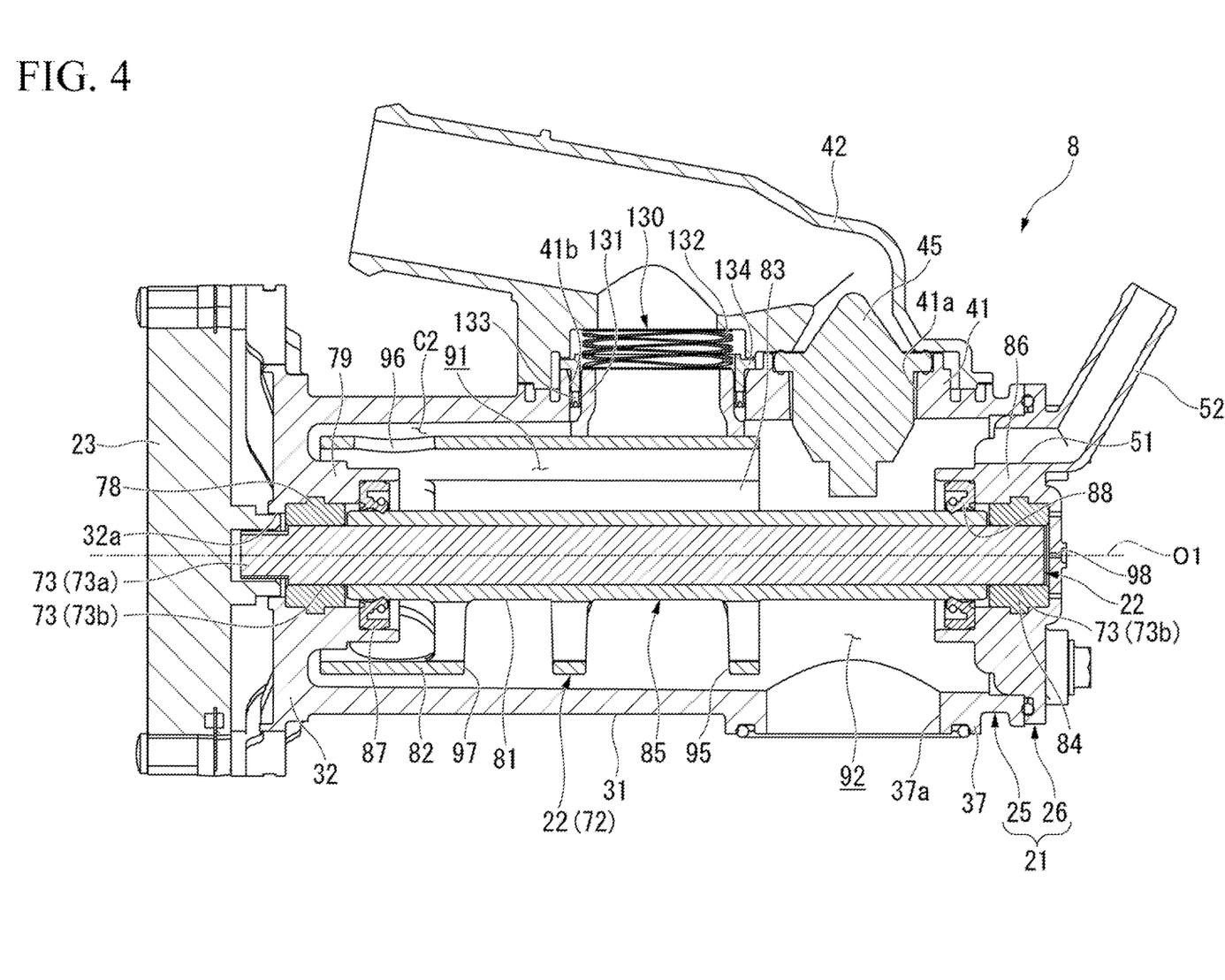
FIG. 4 is a cross-sectional view along line IV-IV of FIG. 2.

FIG. 4 is a cross-sectional view along line IV-IV of FIG. 2.

As shown in FIGS. 3 and 4, an inflow port 37 that protrudes outward in the case radial direction is formed in a portion positioned on the second side of the case circumferential wall 31. An inlet 37a (see FIG. 4) penetrating the inflow port 37 in the case radial direction is formed in the inflow port 37. The inlet 37a provides communication with an inside and an outside of the casing 21. The main flow path 10 (see FIG. 1) described above is connected to an end face of an opening (an outer end face in the case radial direction) of the inflow port 37.

As shown in FIG. 4, a radiator port 41 protruding outward in the case radial direction is formed on the case circumferential wall 31 at a position opposite to the inflow port 37 across the axis O1 in the case radial direction. A fail opening 41a and a radiator outlet 41b (an outlet) are formed in the radiator port 41 side by side in the case axial direction. The fail opening 41a and the radiator outlet 41b both penetrate the radiator port 41 in the case radial direction. In the present embodiment, the fail opening 41a is opposed to the aforementioned inlet 37a in the case radial direction. Also, the radiator outlet 41b is positioned on the first side in the case axial direction with respect to the fail opening 41a.

A radiator joint 42 is connected to an end face of an opening (an outer end face in the case radial direction) of the radiator port 41. The radiator joint 42 provides connection between the radiator port 41 and an upstream end portion of the radiator flow path 11 (see FIG. 1). Further, the radiator joint 42 is welded (for example, by vibration welding and the like) to the end face of the opening of the radiator port 41.

A thermostat 45 is provided in the fail opening 41a. The thermostat 45 is opposed to the aforementioned inlet 37a in the case radial direction. The thermostat 45 opens and closes the fail opening 41a in accordance with a temperature of the cooling water flowing in the casing 21.

An EGR outlet 51 is formed in a portion of the lid body 26 that is positioned closer to the radiator port 41 in the case radial direction with respect to the axis O1. The EGR outlet 51 penetrates the lid body 26 in the case axis direction. In the present embodiment, the EGR outlet 51 intersects (perpendicularly) in an opening direction (case radial direction) of the fail opening 41a. Also, the EGR outlet 51 at least partially overlaps the thermostat 45 in a front view seen in the case axis direction.

In the lid body 26, an EGR joint 52 is formed at an edge of an opening of the EGR outlet 51. The EGR joint 52 is formed in a tubular shape that extends further outward in the case radial direction toward the second side in the case axis direction and connects the EGR outlet 51 and an upstream end portion of the aforementioned EGR flow path 14 (see FIG. 1).

As shown in FIG. 3, the warm-up port 56 that protrudes outward in the case radial direction is formed in a portion of the case circumferential wall 31 that is positioned on the first side in the case axis direction with respect to the radiator port 41. A warm-up outlet 56a (an outlet) that penetrates the warm-up port 56 in the case radial direction is formed in the warm-up port 56. A warm-up joint 62 is connected to an end face of an opening of the warm-up port 56. The warm-up joint 62 connects the warm-up port 56 and an upstream end portion of the aforementioned warm-up flow path 12 (see FIG. 1). Also, the warm-up joint 62 is welded (for example, by vibration welding and the like) to the end face of the opening of the warm-up port 56.

As shown in FIGS. 2 and 3, an air conditioning port 66 is formed in the case circumferential wall 31 between the radiator port 41 and the warm-up port 56 in the case axis direction and at a position shifted about 180 degrees in the case circumferential direction with respect to the warm-up port 56. An air conditioning outlet 66a (an outlet) that penetrates the air conditioning port 66 in the case radial direction is formed in the air conditioning port 66. An air conditioning joint 68 is connected to an end face of an opening of the air conditioning port 66. The air conditioning joint 68 connects the air conditioning port 66 and an upstream end portion of the aforementioned air conditioning flow path 13 (see FIG. 1). Also, the air conditioning joint 68 is welded (for example, by vibration welding and the like) to the end face of the opening of the air conditioning port 66.

(Drive Unit)

As shown in FIG. 2, the drive unit 23 is attached to the bottom wall portion 32 of the casing body 25. In the drive unit 23, a motor, a speed reduction mechanism, a control board, and the like (not shown) are accommodated in a unit case.

(Valve Body)

As shown in FIGS. 3 and 4, the valve body 22 is accommodated in the casing 21. The valve body 22 is formed in a cylindrical shape and is disposed coaxially with the axis O1 of the casing 21 inside the casing 21. The valve body 22 rotates around the axis O1, thereby opening and closing the above-described outlets (the radiator outlet 41b, the warm-up outlet 56a, and the air conditioning outlet 66a).

As shown in FIG. 4, the valve body 22 is configured by insert molding an inner shaft portion 73 inside a rotor main body 72. The inner shaft portion 73 extends coaxially with the axis O1.

A first side end portion of the inner shaft portion 73 penetrates the bottom wall portion 32 in the case axis direction through a through hole (an atmosphere opening portion) 32a formed in the bottom wall portion 32. The first side end portion of the inner shaft portion 73 is rotatably supported by a first bush (a first bearing) 78 provided on the bottom wall portion 32 described above.

Specifically, a first shaft receiving wall 79 is formed on the bottom wall portion 32 toward the second side in the case axis direction. The first shaft receiving wall 79 surrounds the through hole 32a described above. The aforementioned first bush 78 is fitted inside the first shaft receiving wall 79.

A connection portion 73a is formed in a portion of the inner shaft portion 73 that is positioned on the first side in the case axis direction from the first bush 78 (a portion that is positioned outside the bottom wall portion 32). The connection portion 73a is connected to the aforementioned drive unit 23 outside the casing 21.

Thus, the power of the drive unit 23 is transmitted to the inner shaft portion 73.

A second side end portion of the inner shaft portion 73 is rotatably supported by a second bush (a second bearing) 84 provided in the lid body 26 described above.

Specifically, a second shaft receiving wall 86 is formed on the lid body 26 toward the first side in the case axis direction. The second shaft receiving wall 86 surrounds the axis O1 at a position inward in the case radial direction from the EGR outlet 51 described above. The aforementioned second bush 84 is fitted inside the second shaft receiving wall 86.

The rotor main body 72 surrounds the inner shaft portion 73 described above. The rotor main body 72 has an outer shaft portion 81 which covers the inner shaft portion 73, a circumferential wall portion 82 which surrounds the outer shaft portion 81, and a spoke portion 83 which connects the outer shaft portion 81 and the circumferential wall portion 82.

The outer shaft portion 81 surrounds the entire circumference of the inner shaft portion 73 in a state where both end portions of the inner shaft portion 73 in the case axis direction are exposed. In the present embodiment, a rotational shaft 85 of the valve body 22 is configured of the outer shaft portion 81 and the inner shaft portion 73.

In the first shaft receiving wall 79 described above, a first lip seal 87 is provided at a portion positioned on the second side in the case axis direction with respect to the first bush 78. The first lip seal 87 seals between an inner circumferential surface of the first shaft receiving wall 79 and an outer circumferential surface of the rotational shaft 85 (outer shaft portion 81). A portion of the first shaft receiving wall 79 positioned on the first side in the case axis direction with respect to the first lip seal 87 opens to the atmosphere through the through hole 32a.

On the other hand, a second lip seal 88 is provided in a portion positioned on the first side in the case axis direction with respect to the second bush 84 in the second shaft receiving wall 86 described above. The second lip seal 88 seals between an inner circumferential surface of the second shaft receiving wall 86 and the outer circumferential surface of the rotational shaft 85 (outer shaft portion 81). The lid body 26 is formed with a through hole (atmosphere opening portion) 98 that penetrates the lid body 26 in the case axis direction.

The circumferential wall portion 82 of the valve body 22 is disposed coaxially with the axis O1. The circumferential wall portion 82 is disposed in a portion of the casing 21 that is positioned on the first side in the case axis direction with respect to the inlet 37a. Specifically, the circumferential wall portion 82 is disposed at a position in the case axis direction which avoids the fail opening 41a and straddles the radiator outlet 41b, the warm-up outlet 56a, and the air conditioning outlet 66a. An inner side of the circumferential wall portion 82 constitutes a flow passage 91 through which the cooling water that has flowed inside the casing 21 through the inlet 37a flows in the case axis direction. On the other hand, in the casing 21, a portion positioned on the second side in the case axis direction with respect to the circumferential wall portion 82 constitutes a connection flow path 92 communicating with the flow passage 91. Further, a gap C2 is provided in the case radial direction between an outer circumferential surface of the circumferential wall portion 82 and an inner circumferential surface of the case circumferential wall 31.

In the circumferential wall portion 82, a valve hole 95 penetrating the circumferential wall portion 82 in the case radial direction is formed at the same position in the case axis direction as the radiator outlet 41b described above. When the valve hole 95 at least partially overlaps a seal cylinder member 131 inserted into the radiator outlet 41b when viewed in the case radial direction, the inner side of the circumferential wall portion 82 (flow passage 91) and the radiator outlet 41b communicate with each other through the valve hole 95.

In the circumferential wall portion 82, another valve hole 96 penetrating the circumferential wall portion 82 in the case radial direction is formed at the same position in the case axis direction as the warm-up outlet 56a described above. When the valve hole 96 at least partially overlaps a seal cylinder member 131 inserted into the warm-up outlet 56a when viewed in the case radial direction, the inner side of the circumferential wall portion 82 (flow passage 91) and the warm-up outlet 56a communicate with each other through the valve hole 96.

In the circumferential wall portion 82, another valve hole 97 penetrating the circumferential wall portion 82 in the case radial direction is formed at the same position in the case axis direction as the air conditioning outlet 66a described above. When the valve hole 97 at least partially overlaps a seal cylinder member 131 inserted into the air conditioning outlet 66a when viewed in the case radial direction, the inner side of the circumferential wall portion 82 (flow passage 91) and the air conditioning outlet 66a communicate with each other through the valve hole 97.

As the valve body 22 rotates around the axis O1, it switches between communication and blocking between the valve holes 95, 96, and 97 and the corresponding outlets 41b, 56a, and 66a. Also, the pattern of communication between the valve holes 95, 96, and 97 and the outlets 41*b*, 56*a*, and 66*a* can be set as appropriate.

Next, details of a connection portion between the warm-up port 56 and the warm-up joint 62 will be described. Also, since a connection portion between the radiator port 41 and the radiator joint 42 and a connection portion between the air conditioning port 66 and the air conditioning joint 68 have the same configuration as the connection portion between the warm-up port 56 and the warm-up joint 62, descriptions thereof will be omitted.

Figure 5:
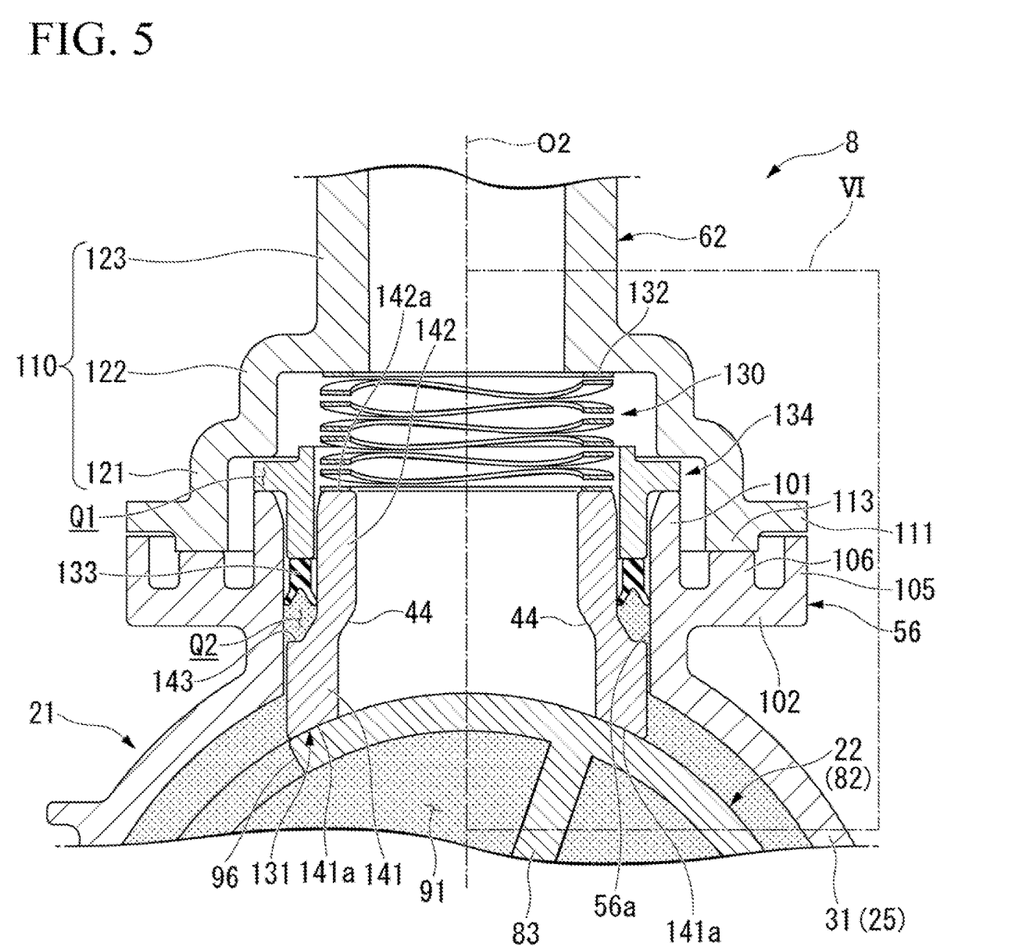
FIG. 5 is an enlarged view along line V-V of FIG. 2.

FIG. 5 is an enlarged cross-sectional view corresponding to line V-V of FIG. 2. In the following description, a direction along an axis O2 of the warm-up outlet 56*a* may be referred to as a port axis direction (a first direction). In this case, in the port axis direction, a direction toward the axis O1 with respect to the warm-up port 56 is referred to as inward, and a direction away from the axis O1 with respect to the warm-up port 56 is referred to as outward. Also, a direction orthogonal to the axis O2 may be referred to as a port radial direction (a second direction), and a direction around the axis O2 may be referred to as a port circumferential direction.

As shown in FIG. 5, the warm-up port 56 has a seal cylinder portion 101 which extends in the port axis direction, and a port flange portion 102 which protrudes outward from the seal cylinder portion 101 in the port radial direction. The inside of the seal cylinder portion 101 constitutes the warm-up outlet 56*a* (an outlet) described above. In the present embodiment, an inner diameter of the seal cylinder portion 101 is made uniform in a region excluding an outer end portion thereof in the port axis direction.

A surrounding wall 105 protruding outward in the port axis direction is formed at an outer circumferential portion of the port flange portion 102. The surrounding wall 105 is formed over the entire circumference of the port flange portion 102. In the port flange portion 102, a port joining portion 106 protruding outward in the port axis direction is formed at a portion positioned inward in the port radial direction from the surrounding wall 105.

The port joining portion 106 is formed over the entire circumference of the port flange portion 102.

The warm-up joint 62 has a joint cylinder portion 110 disposed coaxially with the axis O2, and a joint flange portion 111 protruding outward in the port radial direction from an inner end portion of the joint cylinder portion 110 in the port axis direction.

The joint flange portion 111 is formed in an annular shape having an outer diameter equal to that of the port flange portion 102 and an inner diameter larger than an outer diameter of the seal cylinder portion 101. The joint joining portion 113 protruding inward in the port axis direction is formed on an inner circumferential portion of the joint flange portion 111. The joint joining portion 113 faces the port joining portion 106 in the port axis direction.

The warm-up port 56 and the warm-up joint 62 are joined to each other by vibration welding of opposing surfaces of the port joining portion 106 and the joint joining portion 113.

The joint cylinder portion 110 extends from an inner circumferential edge of the joint flange portion 111 outward in the port axis direction. The joint cylinder portion 110 is formed in a multistage cylinder shape whose diameter is reduced stepwise outward in the port axis direction. Specifically, the joint cylinder portion 110 has a large diameter portion 121, a medium diameter portion 122, and a small diameter portion 123 which are connected to each other in order outward in the port axis direction.

The large diameter portion 121 surrounds the above-described seal cylinder portion 101 at a position outward in the port radial direction from the seal cylinder portion 101 with a gap therebetween. The medium diameter portion 122 is opposed to the seal cylinder portion 101 with a gap Q1 therebetween in the port axis direction.

A seal mechanism 130 is provided at a portion surrounded by the warm-up port 56 and the warm-up joint 62. The seal mechanism 130 includes the seal cylinder member 131, a biasing member 132, a seal ring 133, and a holder 134. Further, as shown in FIG. 3, sealing mechanisms 130 having the same configuration as that of the sealing mechanism 130 provided in the warm-up port 56 are also provided in the radiator port 41 and the air conditioning port 66 described above. In the description of the present embodiment, the seal mechanisms 130 provided in the radiator port 41 and the air conditioning port 66 are denoted by the same reference numerals as those of the seal mechanism 130 provided in the warm-up port 56, and the description thereof will be omitted.

As shown in FIG. 5, the seal cylinder member 131 is inserted into the warm-up outlet 56*a*. The seal cylinder member 131 has a circumferential wall extending coaxially with the axis O2. The circumferential wall of the seal cylinder member 131 is formed in a multistage cylinder shape whose outer diameter is reduced stepwise outward in the port axis direction. Specifically, the circumferential wall of the seal cylinder member 131 has a first cylindrical portion 142 that is positioned outward in the port axis direction (on one axial end side) and communicates with a downstream side of the warm-up outlet 56*a*, and a second cylindrical portion 141 that is positioned inward in the port axial direction (the other axial end side) and has larger inner and outer diameters than those of the first cylindrical portion 142.

In the seal cylinder member 131, the second cylindrical portion 141 having a larger diameter is slidably inserted into an inner circumferential surface of the seal cylinder portion 101. An inner end face of the second cylindrical portion 141 in the port axis direction constitutes a valve sliding contact surface 141*a* that slidably abuts the outer circumferential surface of the circumferential wall portion 82 of the valve body 22. Also, in the present embodiment, the valve sliding contact surface 141*a* is a curved surface formed to conform to a radius of curvature of the outer circumferential surface of the circumferential wall portion 82.

An outer circumferential surface of the first cylindrical portion 142 is connected to an outer circumferential surface of the second cylindrical portion 141 through a step surface 143. The step surface 143 is inclined outward in the port radial direction as it goes inward in the port axis direction, and then further extends outward in the port radial direction. Therefore, a seal gap Q2 is provided in the port radial direction between the outer circumferential surface of the first cylindrical portion 142 having a smaller diameter and the inner circumferential surface of the seal cylinder portion 101.

An outer end face (hereinafter referred to as a "seat surface 142*a*") of the first cylindrical portion 142 in the port axis direction is a flat surface orthogonal to the port axis direction. The seat surface 142*a* of the first cylindrical portion 142 is disposed at a position equivalent to an outer end face of the seal cylinder portion 101 in the port axis direction. Also, the seal cylinder member 131 is separated from the warm-up joint 62 in the port radial direction and the port axis direction.

The biasing member 132 is interposed between the seat surface 142a of the seal cylinder member 131 and an inner end face of the small diameter portion 123 of the warm-up joint 62 in the port axis direction. The biasing member 132 is a wave spring, for example. The biasing member 132 biases the seal cylinder member 131 inward in the port axis direction (toward the circumferential wall portion 82).

The seal ring 133 is, for example, a Y packing. The seal ring 133 is externally inserted into the first cylindrical portion 142 of the seal cylinder member 131 with an opening portion (forked portion) thereof facing inward in the port axis direction. Specifically, in a state where the seal ring 133 is disposed in the seal gap Q2 described above, tip portions of the forked portion are slidably in close contact with the outer circumferential surface of the first cylindrical portion 142 and the inner circumferential surface of the seal cylinder portion 101, respectively. Further, in the seal gap Q2, a hydraulic pressure in the casing 21 is introduced into a region inward in the port axis direction with respect to the seal ring 133 through a gap between the inner circumferential surface of the seal cylinder portion 101 and the second cylindrical portion 141 of the seal cylinder member 131. The step surface 143 is formed to face in a direction opposite to the valve sliding contact surface 141a of the seal cylinder member 131 in the port axis direction. The step surface 143 constitutes a pressure receiving surface that receives a hydraulic pressure of the cooling water in the casing 21 and is pressed inward in the port axis direction.

Figure 6:
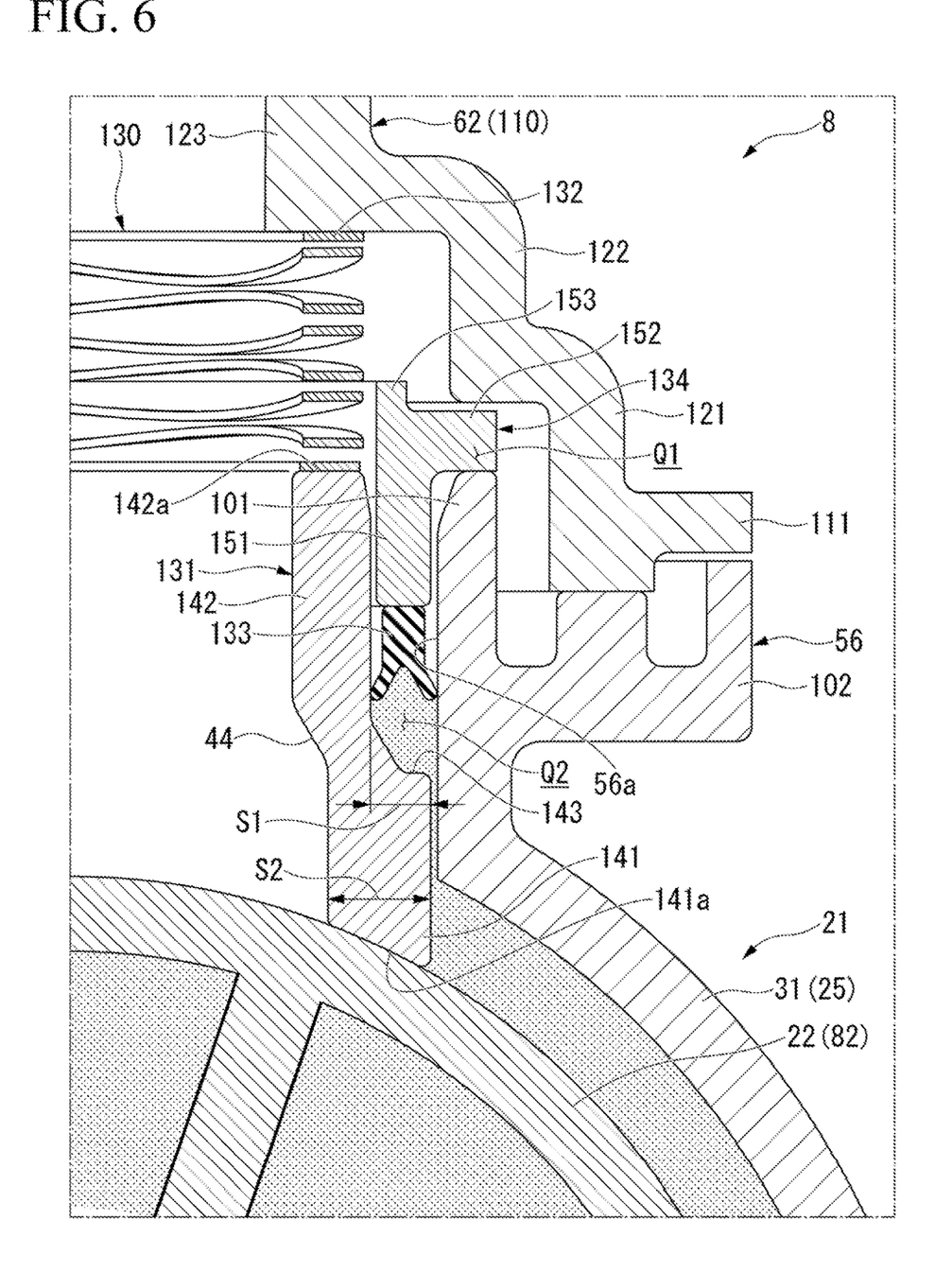
FIG. 6 is an enlarged view of portion VI of FIG. 5.

FIG. 6 is an enlarged view of portion VI of FIG. 5.

Here, in the seal cylinder member 131, an area S1 of the step surface 143 and an area S2 of the valve sliding contact surface 141a are set to satisfy the following equations (1) and (2).

$$S1 < S2 \leq S1/k \quad (1)$$

$$\alpha \leq k < 1 \quad (2)$$

K: Pressure reduction constant of cooling water flowing through a minute gap between the valve sliding contact surface 141a and the circumferential wall portion 82 of the valve body 22

α: Lower limit value of the pressure reduction constant determined by physical properties of cooling water Also, the area S1 of the step surface 143 and the area S2 of the valve sliding contact surface 141a indicate areas when projected in the port axis direction.

The value α in Equation (2) is a standard value of a pressure reduction constant determined by a type of cooling water, a use environment (for example, temperature), and the like. For example, α=½ in the case of water under normal use conditions. When physical properties of cooling water for use changes, the value changes to α=⅓, etc.

Further, when the valve sliding contact surface 141a uniformly comes into contact with the circumferential wall portion 82 from an outer edge to an inner edge thereof in the port radial direction, the pressure reduction constant k in Equation (2) is a (for example, ½) that is a standard value of the pressure reduction constant. However, a gap between an outer circumferential portion of the valve sliding contact surface 141a and the circumferential wall portion 82 may slightly increase with respect to an inner circumferential portion of the valve sliding contact surface 141a due to a manufacturing error or an assembly error of the seal cylinder member 131. In this case, the pressure reduction constant k in the equation (2) gradually approaches k=1.

In the present embodiment, on the premise that there is a minute gap between the valve sliding contact surface 141a of the seal cylinder member 131 and the outer circumferential surface of the circumferential wall portion 82 to allow sliding therebetween, the relationship between the areas S1 and S2 of the step surface 143 and the valve sliding contact surface 141a is determined by the equations (1) and (2).

That is, as described above, the pressure of the cooling water in the casing 21 as it is acts on the step surface 143 of the seal cylinder member 131. On the other hand, the pressure of the cooling water in the casing 21 as it is does not act on the valve sliding contact surface 141a. Specifically, when the cooling water flows through the minute gap between the valve sliding contact surface 141a and the circumferential wall portion 82 from the outer edge toward the inner edge in the port radial direction, the pressure of the cooling water acts while being accompanied by a decrease in pressure. At this time, the pressure of the cooling water gradually decreases inward in the port radial direction, and tries to push up the seal cylinder member 131 outward in the port axis direction.

As a result, a force obtained by multiplying the area S1 of the step surface 143 by the pressure P in the casing 21 as it is acts on the step surface 143 of the seal cylinder member 131. On the other hand, a force obtained by multiplying the area S2 of the valve sliding contact surface 141a by the pressure P in the casing 21 and the pressure reduction constant k acts on the valve sliding contact surface 141a of the seal cylinder member 131.

The areas S1 and S2 of the control valve 8 of the present embodiment are set such that k×S2≤S1 is established as is apparent from the equation (1). For this reason, the relationship of P×k×S2≤P×S1 is also established.

Accordingly, a force F1 (F1=P×S1) acting on the step surface 143 of the seal cylinder member 131 in a pressing direction becomes equal to or larger than a force F2 (F2=P×k×S2) acting on the valve sliding contact surface 141a of the seal cylinder member 131 in a floating direction. Therefore, in the control valve 8 of the present embodiment, a space between the seal cylinder member 131 and the circumferential wall portion 82 can be sealed only by the relations in pressure of the cooling water in the casing 21.

On the other hand, in the present embodiment, as described above, the area S1 of the step surface 143 of the seal cylinder member 131 is smaller than the area S2 of the valve sliding contact surface 141a. For that reason, even if the pressure of the cooling water in the casing 21 increases, the valve sliding contact surface 141a of the seal cylinder member 131 can be inhibited from being pressed against the circumferential wall portion 82 with an excessive force. Therefore, when the control valve 8 of the present embodiment is adopted, an increase in the size and output of the drive unit 23 that rotationally drives the valve body 22 can be avoided, and early wear of the seal cylinder member 131 and the bushes 78 and 84 (see FIG. 4) can be inhibited.

As described above, in the present embodiment, the area S2 of the valve sliding contact surface 141a is set to be larger than the area S1 of the step surface 143 within a range in which the pressing force acting on the seal cylinder member 131 inward in the port axis direction does not fall below the floating force acting on the seal cylinder member 131 outward in the port axis direction. For that reason, it is possible to seal between the seal cylinder member 131 and the circumferential wall portion 82 while inhibiting the pressing of the seal cylinder member 131 against the circumferential wall portion 82 with an excessive force.

The holder 134 described above is configured to be movable in the port axis direction with respect to the warm-up port 56 and the warm-up joint 62 in the gap Q1.

Further, the holder 134 is disposed in at least one of the warm-up port 56 and the warm-up joint 62 to be able to be separated in the port axis direction. The holder 134 has a holder cylinder portion 151, a holder flange portion 152, and a restriction portion 153.

The holder cylinder portion 151 extends in the port axis direction. The holder cylinder portion 151 is inserted into the seal gap Q2 from an outer side in the port axis direction. A bottom portion of the above-described seal ring 133 can be brought into contact with an inner end face of the holder cylinder portion 151 in the port axis direction. That is, the holder cylinder portion 151 restricts movement of the seal ring 133 outward in the port axis direction.

The holder flange portion 152 is provided to protrude outward in the port radial direction from an outer end portion of the holder cylinder portion 151 in the port axis direction. The holder flange portion 152 is disposed in the gap Q1 between the outer end face of the seal cylinder portion 101 in the port axis direction and an inner end face of the medium diameter portion 122 in the port axis direction. A movement of the holder 134 inward in the port axis direction is restricted by the seal cylinder portion 101, and a movement of the holder 134 outward in the port axis direction is restricted by the medium diameter portion 122.

The restriction portion 153 is formed to protrude in a cylindrical shape from an inner circumferential portion of the holder cylinder portion 151 outward in the port axis direction. The restriction portion 153 restricts movement of the biasing member 132 in the port radial direction in cooperation with the holder cylinder portion 151.

[Details of Seal Cylinder Member]

Figure 7:
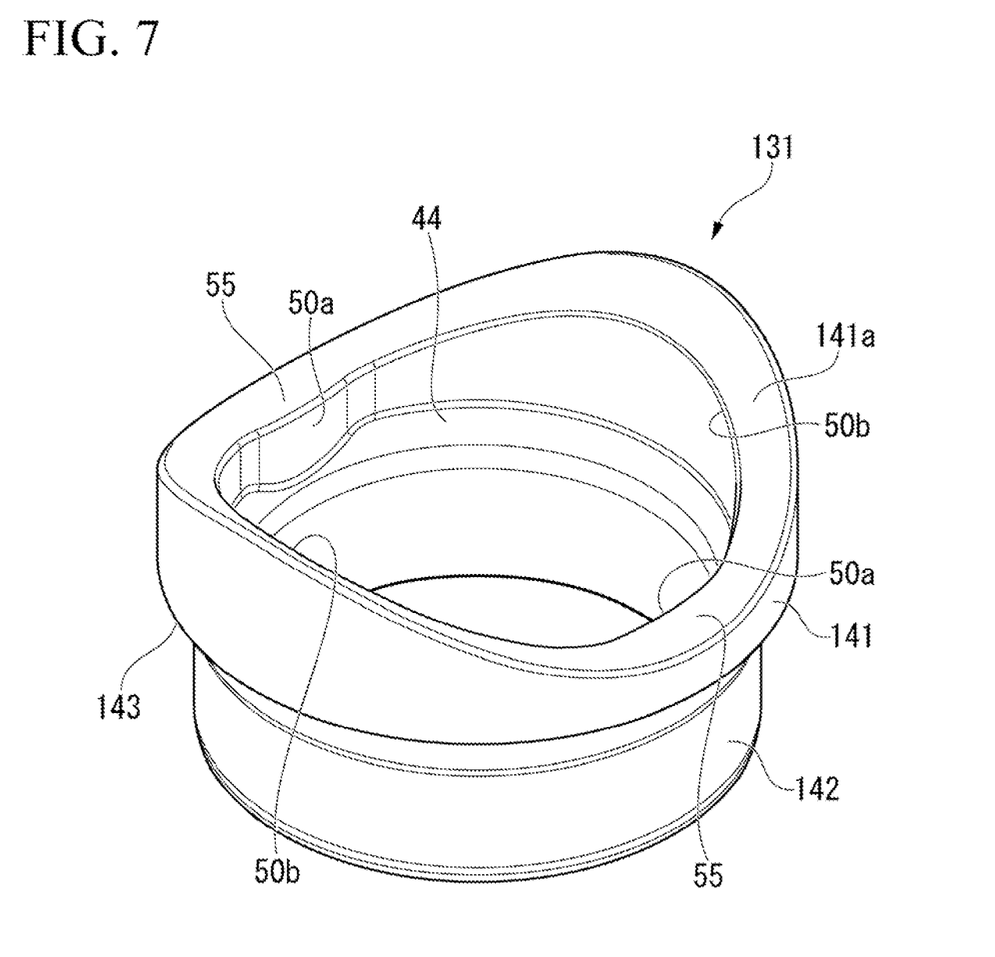
FIG. 7 is a perspective view of a seal cylinder member of the embodiment.
Figure 8:
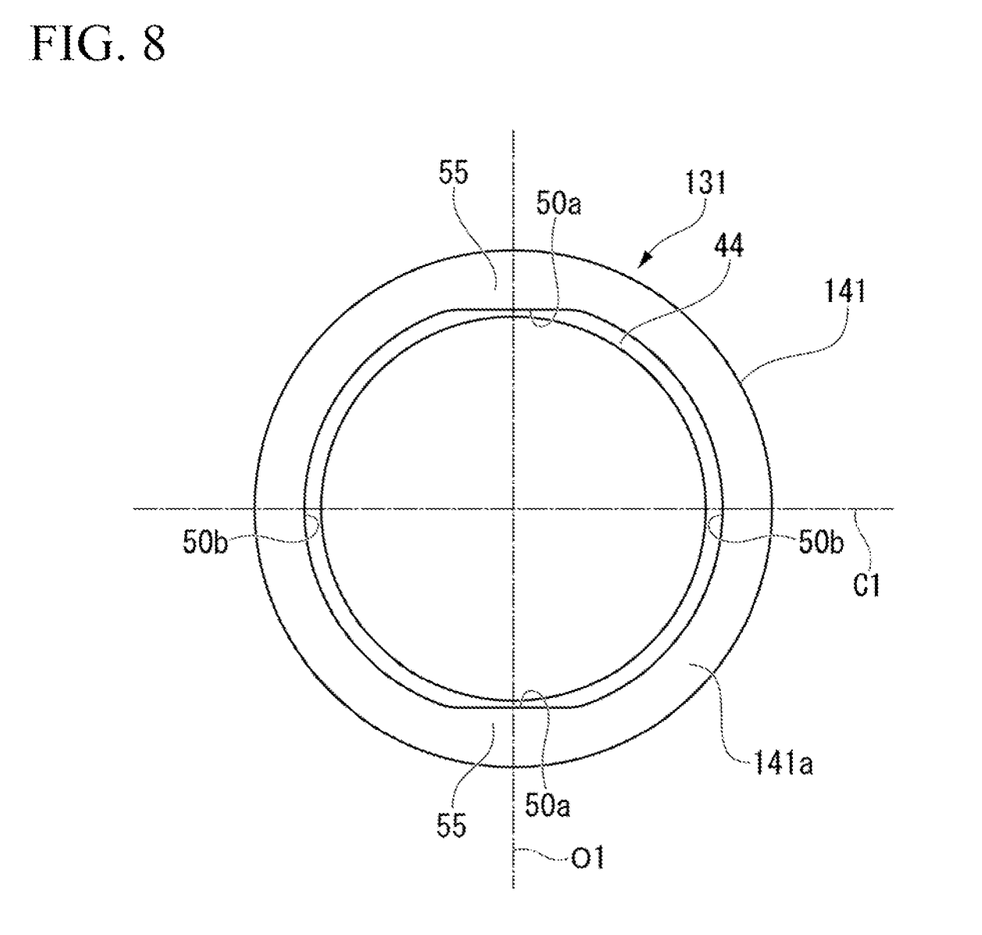
FIG. 8 is an end view of the seal cylinder member of the embodiment.

FIG. 7 is a perspective view of the seal cylinder member 131 when viewed with the valve sliding contact surface 141a side facing upward. FIG. 8 is an end view of the seal cylinder member 131 when viewed from the valve sliding contact surface 141a side.

The seal cylinder member 131 includes the first cylindrical portion 142 and the second cylindrical portion 141 having an outer diameter larger than that of the first cylindrical portion 142. The valve sliding contact surface 141a that slidably comes into contact with the outer circumferential surface of the circumferential wall portion 82 of the valve body 22 is provided at an end portion of the second cylindrical portion 141 in an axial direction thereof (the other end portion in the axial direction). The step surface 143 is provided between the outer circumferential surface of the first cylindrical portion 142 and the outer circumferential surface of the second cylindrical portion 141. Further, the inner diameter of the first cylindrical portion 142 is formed to be smaller than the inner diameter of the second cylindrical portion 141. A step surface 44 is provided between the inner circumferential surface of the first cylindrical portion 142 and the inner circumferential surface of the second cylindrical portion 141.

The circumferential wall of the end portion of the second cylindrical portion 141 in the axial direction (the end portion positioned inward in the port axis direction) has a protruding height in a direction toward the circumferential wall portion 82 that is continuously changing in a circumferential direction thereof to conform to the shape of the outer circumferential surface of the circumferential wall portion 82 of the valve body 22. That is, the protruding height of the circumferential wall of the end portion of the second cylindrical portion 141 in the axial direction changes continuously so that the valve sliding contact surface 141a is in surface contact with the outer circumferential surface of the circumferential wall portion 82 of the valve body 22.

The end portion of the second cylindrical portion 141 in the axial direction has the lowest protruding height in a region positioned most outward in a direction along the axis O1 (the rotational axis of the valve body 22), and has the highest protruding height in a region positioned most outward in a direction orthogonal to the axis O1 (a direction along a rotating direction of the valve body 22). In addition, the sign C1 in FIG. 8 is a centerline which shows a center of the valve hole 96 (95 and 97) in a direction of the axis O1 of the valve body 22.

The seal cylinder member 131 has thick portions 55 in two regions (two regions including the region where the protruding height in the valve body 22 direction is minimized) in which the protruding height of the circumferential wall of the second cylindrical portion 141 in the direction toward the circumferential wall portion 82 of the valve body 22 (hereinafter referred to as a "protruding height in the valve body 22 direction") is lower. Each thick portion 55 is provided on the inner circumferential portion of the second cylindrical portion 141 to protrude inward in a radial direction thereof.

As shown in FIG. 8, the thick portions 55 disposed at two positions are formed to have inner edge portions that face inward in the radial direction and parallel to each other when the seal cylinder member 131 is viewed from the axial direction (port axis direction). Linear inner edge portions 50a facing each other are formed by the thick portions 55 on a radially inner side of the second cylindrical portion 141. Inner edge portions 50b of the second cylindrical portion 141 other than the linear inner edge portions 50a are formed in an arc shape centering on the axis of the second cylindrical portion 141. In the case of the present embodiment, the thickest portion of the thick portion 55 is disposed at a portion having the lowest protruding height of the end portion of the second cylindrical portion 141.

Also, the thick portion 55 is desirably formed not to protrude further inward in the radial direction than the inner diameter of the first cylindrical portion 142.

Further, although the thick portion 55 is formed to protrude radially inward on the inner circumferential surface of the second cylindrical portion 141, the thick portion 55 extends from the step surface 44 portion between the first cylindrical portion 142 and the second cylindrical portion 141 to a region reaching the valve sliding contact surface 141a of the second cylindrical portion 141 (the end face of the other end portion of the seal cylinder member 131 in the axial direction). The valve sliding contact surface 141a formed on the end face of the second cylindrical portion 141 on the valve body 22 side is formed such that its width in the radial direction is partially increased by the thick portion 55 as compared to the other region of the second cylindrical portion 141 in the circumferential direction.

[Operation Method of Control Valve]

Next, a method of operating the control valve 8 will be described.

As shown in FIG. 1, in the main flow path 10, cooling water sent out by the water pump 3 is heat-exchanged in the engine 2 and then flows toward the control valve 8. As shown in FIG. 4, the cooling water that has passed through the engine 2 in the main flow path 10 flows into the connection flow path 92 in the casing 21 through the inlet 37a.

Some of the cooling water that has flowed into the connection flow path 92 flows into the EGR outlet 51. The cooling water that has flowed into the EGR outlet 51 passes through the EGR joint 52 and is supplied into the EGR flow path 14. The cooling water supplied into the EGR flow path 14 is returned to the main flow path 10 after heat exchange between the cooling water and the EGR gas is performed in the EGR cooler 7.

On the other hand, in the cooling water that has flowed into the connection channel 92, the cooling water that has not flowed into the EGR outlet 51 flows into the flow passage 91 from the second side in the case axis direction. The cooling water that has flowed into the flow passage 91 is distributed to each outlet in the course of flowing through the flow passage 91 in the case axis direction. That is, the cooling water flowing into the flow passage 91 is distributed to the flow paths 11 to 13 through the outlets communicating with the corresponding valve holes among the outlets.

In the control valve 8, in order to switch the pattern of communication between the valve holes and the outlets, the valve body 22 is rotated around the axis O1. In addition, by stopping the rotation of the valve body 22 at a position corresponding to the pattern of communication that has been set, the valve holes communicate with the outlets in the pattern of communication corresponding to a stop position of the valve body 22.

Effects of the Embodiment

As described above, the control valve 8 of the present embodiment is provided with the thick portion 55, which is thicker than the other portions and reaches the valve-sliding contact surface 141a, in the region in which the protruding height in the valve body 22 direction is lower in the circumferential wall of the end portion of the seal cylinder member 131 in the axial direction. For this reason, it is possible to inhibit an increase in local surface pressure in the region where the protruding height is lower, in which a Hertz surface pressure tends to be higher, in the valve sliding contact surface 141a of the seal cylinder member 131. Therefore, when the control valve 8 of the present embodiment is adopted, early wear of the seal cylinder member 131 can be inhibited.

Also, in the control valve 8 of the present embodiment, since the thick portion 55 is provided to protrude inward in the radial direction from the circumferential wall of the seal cylinder member 131 (the first cylindrical portion 142), the outer circumferential surface of the larger diameter first cylindrical portion 142 of the seal cylinder member 131 can be formed into a simple circular shape. For this reason, an outlet portion on the casing 21 side that slidably holds the first cylindrical portion 142 of the seal cylinder member 131 can be made a simple structure, and a seal structure between the seal cylinder member 131 and the outlet can also be simplified. Therefore, when the configuration of the present embodiment is adopted, the control valve 8 can be easily manufactured and the manufacturing costs can be reduced.

In the control valve 8 of the present embodiment, the linear inner edge portions 50a extending in the direction orthogonal to the axis O1 of the valve body 22 are formed by the thick portions 55 at two positions facing each other in the inner circumferential portion of the valve sliding contact surface 141a of the seal cylinder member 131. For this reason, the shape of the inner surface of the seal cylinder member 131 is also relatively simple, and the seal cylinder member 131 can be easily manufactured at a low cost. In addition, since the pair of linear inner edge portions 50a is formed on the inner circumferential portion of the valve sliding contact surface 141a by the thick portions 55, the position of the seal cylinder member 131 in the circumferential direction can be easily grasped due to the linear inner edge portions 50a in the inner circumferential portion when the seal cylinder member 131 is viewed from the end portion in the axial direction. Therefore, when the control valve 8 of the present embodiment is adopted, the seal cylinder member 131 can be easily assembled to the casing 21 side at the time of manufacturing the control valve 8.

Further, in the control valve 8 of the present embodiment, the first cylindrical portion 142 communicating with the outlet of the casing 21 and the second cylindrical portion 141 having the valve sliding contact surface 141a are provided on the seal cylinder member 131, the inner diameter of the first cylindrical portion 142 is formed to be smaller than the inner diameter of the second cylindrical portion 141, and the thick portion 55 is provided on the radially inner side of the second cylindrical portion 141. For this reason, a flow rate of the cooling water flowing out to the downstream side of the outlet through the seal cylinder member 131 is determined by the inner diameter of the first cylindrical portion 142, and the thick portion 55 provided in the second cylindrical portion 141 with a larger inner diameter does not affect a flow rate of the cooling water which flows out from the outlet. Therefore, when the configuration of the present embodiment is adopted, the flow rate of the liquid flowing out from the outlet can be easily set and adjusted.

Also, it should be understood that the present invention is not limited to the above embodiments, and various changes in design can be made without departing from the scope of the invention. For example, in the above-described embodiment, the thick portion 55 is provided to protrude inward in the radial direction from the circumferential wall of the seal cylinder member 131, but the thick portion 55 may be provided to protrude outward in the radial direction from the circumferential wall of the seal cylinder member 131. Moreover, the thick portion 55 does not necessarily need to be linear and can be formed in any shape other than a linear shape.

What is claimed is:
1. A control valve comprising:
a casing including an inlet through which a liquid flows in from an outside and an outlet through which the liquid that has flowed in an inside flows to the outside;
a valve body which is rotatably disposed inside the casing and includes a circumferential wall portion formed with a valve hole providing communication between the inside and the outside; and
a seal cylinder member of which one axial end portion communicates with a downstream side of the outlet and an other axial end portion is provided with a valve sliding contact surface which slidably comes in contact with an outer circumferential surface of the circumferential wall portion at a position at least partly overlapping a rotational path of the valve hole of the valve body,
wherein
a protruding height of the other axial end portion of the seal cylinder member in a direction toward the circumferential wall portion continuously changes in a circumferential direction thereof to conform to a shape of the outer circumferential surface of the circumferential wall portion,
the seal cylinder member includes a first cylindrical portion which is positioned on the one end portion side and communicates with the downstream side of the outlet and a second cylindrical portion which is positioned on the other end portion side and whose axial end surface constitutes the valve sliding contact surface, an inner diameter of the first cylindrical portion being formed to be smaller than an inner diameter of the second cylindrical portion, a thick portion is provided in the second cylindrical portion, the thick portion being thicker than other portions in the second cylindrical portion and reaching the valve sliding contact surface, an end portion of the second cylindrical portion in the axial direction has a lowest protruding height in a region positioned most outward in a direction along a rotational axis of the valve body and has a highest protruding height in a region positioned most outward in a direction orthogonal to the rotational axis, and the thick portion is provided in a region of the other axial end portion of the seal cylinder member where the protruding height is lowest.

2. The control valve according to claim 1, wherein the thick portion is provided to protrude inward from a circumferential wall of the seal cylinder member in a radial direction thereof.

3. The control valve according to claim 2, wherein linear inner edge portions extending in a direction substantially orthogonal to a rotational axis of the valve body are formed by the thick portion at two positions facing each other in an inner circumferential portion of the valve sliding contact surface.

\* \* \* \* \*